United States Patent
Griffith

[15] 3,635,690
[45] Jan. 18, 1972

[54] SOIL TREATING METHOD AND COMPOSITION FOR CONSERVING NITROGEN IN SOIL BY ADDITION OF A PYRAZOLE THERETO

[72] Inventor: Jeffrey D. Griffith, Lafayette, Calif.

[73] Assignee: The Dow Chemical Company, Midland, Mich.

[22] Filed: May 16, 1968

[21] Appl. No.: 739,582

[52] U.S. Cl. .................................................71/1, 71/27
[51] Int. Cl. ..........................................................C05 11/00
[58] Field of Search ...........................71/1, 11, 27, 54, 92; 260/310 C

[56] References Cited

UNITED STATES PATENTS

| | | | |
|---|---|---|---|
| 2,679,453 | 5/1954 | Brett | 71/94 |
| 3,009,804 | 11/1961 | Goring | 71/1 |
| 3,011,886 | 12/1961 | Goring | 71/1 |
| 3,033,668 | 5/1962 | Watkins | 71/1 |
| 3,063,825 | 11/1962 | Weil | 71/126 |
| 3,093,472 | 6/1963 | Homeyer et al. | 71/126 |
| 3,108,927 | 10/1963 | Pyne | 71/122 |
| 3,135,594 | 6/1964 | Goring | 71/1 X |
| 3,173,919 | 3/1965 | Johnston et al. | 71/94 X |
| 3,338,903 | 8/1967 | Harrison | 71/1 |
| 3,338,939 | 8/1967 | Harrison | 71/1 X |
| 3,482,957 | 12/1969 | Ueno et al. | 71/1 |
| 3,498,780 | 3/1970 | Soper | 71/94 X |
| 3,011,885 | 12/1961 | Goring | 71/1 |
| 3,284,188 | 11/1966 | Amagasa et al. | 71/1 X |
| 3,338,903 | 8/1967 | Harrison | 71/27 X |
| 3,494,757 | 2/1970 | Osborne | 71/1 |

FOREIGN PATENTS OR APPLICATIONS

39–13,030  8/1964  Japan........................................71/92

*Primary Examiner*—Reuben Friedman
*Assistant Examiner*—Richard Barnes
*Attorney*—Griswold & Burdick, D. J. De Witt and Richard W. Hummer

[57] ABSTRACT

The present invention relates to crop culture and is particularly concerned with practices for conserving soil nitrogen and for supplying the soil nitrogen requirements for plant nutrition. These practices involve the employment, as an active agent, of a pyrazole compound which may be pyrazole itself or a compound wherein the pyrazole is substituted by a total of not more than two halo, nitro or lower aliphatic radicals, together with the mineral acid addition salts of these compounds.

1 Claims, No Drawings

SOIL TREATING METHOD AND COMPOSITION FOR CONSERVING NITROGEN IN SOIL BY ADDITION OF A PYRAZOLE THERETO

BACKGROUND OF THE INVENTION

The nature of the agricultural problem for which the present invention constitutes a remedy has previously been discussed in the prior art: see, for example, the introduction to U.S. Pat. No. 3,135,594, dated June 2, 1964.

SUMMARY OF THE INVENTION

The present invention is directed to methods and compositions useful in crop culture, and is particularly concerned with new agronomical practices and compositions for conserving nitrogen in soil by suppressing the nitrification of ammonium nitrogen therein. The active agent of the compositions employed in such methods is a pyrazole compound which can be pyrazole itself, a substituted pyrazole or a mineral acid addition salt of these compounds. By "substituted pyrazoles" is meant those compounds having not to exceed two substituents on the pyrazole ring, the substituents on the ring nitrogen being nitro or an aliphatic hydrocarbon radical, and the substituents on the ring carbon being halogen, nitro or alkyl radicals, said aliphatic and alkyl radicals each having not to exceed three carbon atoms. The word "halogen" has the usual meaning and includes chlorine, bromine and iodine, "alkyl" includes methyl, ethyl, propyl and isopropyl, and "aliphatic" includes the latter alkyl radicals as well as vinyl, allyl, ethynyl and propynyl. For convenience of description, those compounds which come within the scope of the foregoing definition, including the mineral acid addition salts, will be referred to herein as "pyrazoles" or "pyrazole compounds."

Representative pyrazole compounds which can be employed in accordance with the present invention include pyrazole, 4-brompyrazole, 4-iodopyrazole, 4-chloropyrazole, 3,4-diiodopyrazole, 3,4-dibromopyrazole, 3-chloro-4-nitropyrazole, 3-methylpyrazole, 1-nitropyrazole, 3-nitropyrazole, 4-nitropyrazole, 4-bromo-1-nitropyrazole, 1,4-dinitropyrazole, 5-chloro-3-methylpyrazole, 4-bromo-3-methylpyrazole, 3,5-dimethylpyrazole, 1,3-dimethylpyrazole, 3-methyl-1-nitropyrazole, 3-methyl-4-nitropyrazole, 3-propyl-1-nitropyrazole, 4-chloro-1-methylpyrazole, 1-ethylpyrazole, 1-allypyrazole, 1-propynylpyrazole, 4-bromo-1-allylpyrazole, 1-propylpyrazole, 4-bromopyrazole hydrobromide, and salts of the foregoing compounds with this and other mineral acids including hydrochloric acid, sulfuric acid, nitric acid and phosphoric acid, as well as hydroiodic acid.

The methods of the present invention comprise impregnating a plant growth medium with the pyrazole compound either with or without an adjuvant. The pyrazole compound, when present in effective amounts, acts to suppress nitrification of ammonium nitrogen in the soil to nitrate nitrogen, thereby preventing rapid loss of ammonium nitrogen from the soil.

DESCRIPTION OF THE PREFERRED EMBODIMENTS

By the practice of this invention, the nitrification of ammonium nitrogen in the soil to nitrate nitrogen is suppressed, thereby preventing the rapid loss of ammonium nitrogen from the soil. Furthermore, by proper distribution of the pyrazole compound, this action of inhibiting the transformation of ammonium nitrogen to nitrate nitrogen is effective over a prolonged period of time. The ammonium nitrogen may arise from added ammonium nitrogen fertilizers or be formed in the soil by conversion of the organic nitrogen constituents found in soil or added thereto as components of organic fertilizers.

The expression "reduced nitrogen fertilizers" is employed in the present specification and claims, as understood in the art, as embracing both inorganic and organic nitrogenous materials containing nitrogen in the reduced state. Examples of known reduced nitrogen fertilizers include anhydrous and aqueous ammonia, inorganic ammonium salts such as ammonium phosphate, ammonium nitrate and ammonium sulfate, ammonium salts of organic acids, urea, cyanamide, guanidine nitrate, dicyandiamide, amino acids, guanyl urea sulfate, thiourea, uramon, amines, urea-form and other nitrogen-containing organic chemical fertilizers as well as protein mixtures, animal tankages, green manure, fish products, crop residues, and other natural materials known to be sources of ammonium ions in soil. These fertilizer materials contain nitrogenous compounds in which the apparent valency or oxidation state of the nitrogen is from −3 to −1, inclusive. Furthermore, inasmuch as the following equilibrium exists in the presence of water even when the latter is present in minor proportions.

it is to be understood that when reference is made herein to either ammonium ion or ammonia in soil it is meant to embrace the other component, namely, ammonia or ammonium ion, respectively.

The provision of an effective, nitrification inhibiting, dosage of the pyrazole compound in the soil or growth medium is essential for the practice of the present invention. In general, good results are obtained when the growth medium is impregnated with the pyrazole compound in the amount of from about 0.01 part to about 4,000 parts or more by weight per million parts by weight of growth medium. (Hereinafter, the term p.p.m. is employed as customary to designate parts per million.) The preferred amounts to be employed are dependent upon the particular situation. Thus, in determining the amount to be employed, consideration is made not only of the treatment need, i.e., soil pH, temperature, soil type, etc., but also of the mode of application to soil. When the pyrazole compound is to be applied in a broadcast application, the amount in p.p.m. may frequently be less than in row or band application where for a substantial depth and width within the vicinity of application there can be a very high concentration of the pyrazole compound. When application is made near the root zone of growing plants or when application is made immediately prior to seeding or transplanting, the amounts supplied are frequently at a lower rate than when application is made at the end of the growing season to prepare the soil for the following season. By dispersing very large dosages in growth media, a prolonged inhibition of nitrification can be obtained over a period of many months. The concentration of the active pyrazole compound is eventually reduced to a minimum by decomposition in the soil.

In one method for carrying out the present invention, the pyrazole compound is distributed throughout the growth media in a broadcast application such as by spraying, dusting, distributing in irrigation water, etc. In such application, the pyrazole compound is supplied in amounts sufficient to permeate the growing area of soil with an amount of from about 0.01 to about 1,000 p.p.m., and preferably, from about 2 to about 250 p.p.m. In field administration, the pyrazole compound can be distributed in the soil in the amount of at least 0.02 pound per acre and through such cross section of the soil as to provide for the presence therein of an effective concentration of the agent. It is usually preferred that the pyrazole compound be distributed to a depth of at least 2 inches below the soil surface and at a dosage of at least 0.1 pound per acre inch of soil.

In another method for carrying out the present invention, the pyrazole compound is administered to growth medium in a band or row application. In such application, administration is made with or without carrier in amounts sufficient to supply to soil or growth medium a concentration of the pyrazole compound which can be as high as 4,000 p.p.m. or more. After administration with or without discing or dragging, subsequent irrigation or rainfall distributes the pyrazole compound throughout the growth medium.

In one embodiment of the present invention, the pyrazole compound is distributed throughout the growth media prior to seeding or transplanting the desired crop plant.

In another embodiment, the soil in the root zone of growing plants is treated with the pyrazole compound in an amount effective to inhibit nitrification but sublethal to plant growth. In such operations, the compounds should be supplied in the soil in amounts which have preferred upper limits at about 50 p.p.m. By following such practice, no adverse effect is exerted by the pyrazole compound upon growth of seeds or plants. Oftentimes it is desirable to treat the soil adjacent to plants, and this procedure may be carried out conveniently in sidedressing operations.

In a further embodiment, soil can be treated with the products following harvest or after fallowing to prevent rapid loss of ammonium nitrogen and to build up the ammonium nitrogen formed by conversion of organic nitrogen compounds. Such practice conserves the soil nitrogen for the following growing season. In such application the upper limit is primarily an economic consideration.

In an additional embodiment, the soil is treated with the pyrazole compound in conjunction with the application of reduced nitrogen fertilizers. The treatment with the pyrazole compound can be carried out prior to, subsequent to or simultaneously with the application of fertilizers. Such practice prevents the rapid loss of the ammonium nitrogen added as fertilizer and the ammonium nitrogen formed from the organic reduced nitrogen in fertilizers by the action of soil bacteria. The administration to the soil of the pyrazole compound in an ammonium nitrogen fertilizer composition constitutes a preferred embodiment of the present invention.

The present invention can be carried out by distributing the pyrazole compound in an unmodified form through growth medium. The present method also embraces distributing the compound as a constituent in liquid or finely divided solid compositions. In such practice, the pyrazole compound can be modified with one or more additaments or soil treating adjuvants including water, petroleum distillates or other liquid carriers, surface-active dispersing agents, inert finely divided solids and fertilizers such as reduced nitrogen fertilizers. Preferred adjuvants are surface-active dispersing agents, inert finely divided solids, and, especially, reduced nitrogen fertilizers; these adjuvants cooperate with the pyrazole compound so as to facilitate the practice of the present invention and to obtain an improved result. Depending upon the concentration of the pyrazole compound, augmented compositions can be distributed in the soil without further modification or can be considered as concentrates and subsequently diluted with additional inert carrier to produce the ultimate treating composition. The required amount of the pyrazole compound can be supplied to growth media in from 1 to 50 gallons of organic solvent carrier, in from 5 to 27,000 or more gallons of aqueous carrier or in from 20 to 2,000 pounds of solid carrier per acre treated. When an organic solvent carrier is employed, it can be further dispersed in the above volume of aqueous liquid carrier.

The concentration of the pyrazole compound in compositions to be employed for the treatment of growth media is not critical and can vary considerably provided the required dosage of effective agent is supplied to the growth media. In general, good results are obtained with liquid compositions containing from about 0.00001 to about 0.25 percent by weight of the pyrazole compound; in some operations, however, compositions containing amounts of pyrazole compound in excess of 0.25 percent, such as from 2 to 98 percent of pyrazole compound by weight of composition are conveniently employed, as for example, in row or band application. With dusts, good results are usually obtained with compositions containing from 0.0001 to 10 percent or more by weight of pyrazole compound. In some circumstances, such as in high-intensity application, however, it is preferred to employ dust compositions containing as much as from 2 to 98 percent or more by weight of the pyrazole compound. Liquid or dust compositions in which the pyrazole compound is present in higher concentration can be utilized as such or can be employed as concentrate compositions to be diluted to prepare actual treating compositions.

Liquid compositions containing the desired amount of the pyrazole compound can be prepared by dispersing the latter in one or more fluid carriers such as water or an organic solvent, with or without the aid of a suitable surface-active dispersing agent or emulsifying agent. Suitable organic solvents include acetone, diisobutylketone, methanol, ethanol, isopropyl alcohol, diethyl ether, toluene, methylene chloride, chlorobenzene and the petroleum distillates. The preferred organic solvents are those which are of such volatility that they leave little permanent residue in the growth media. When the solutions of the pyrazole compound in organic solvents are to be further diluted to produce aqueous dispersions, the preferred solvents include acetone and the alcohols. When the liquid carrier is entirely organic in nature, particularly desirable carriers are the petroleum distillates boiling almost entirely under 400° F. at atmospheric pressure and having a flashpoint above about 80° F. Dispersing and emulsifying agents which can be employed in liquid compositions include condensation products of alkylene oxides with phenols and organic acids, alkyl aryl sulfonates, polyoxyalkylene derivatives of sorbitan esters, complex ether alcohols, mahogany soaps and the like. The surface-active agents are generally employed in the amount of from 1 to 20 percent by weight of the pyrazole compound.

Solid compositions containing the active agent can be prepared by dispersing the latter in finely divided inert solid carriers such as sugar, salt, talc, chalk, gypsum, vermiculite and the like. Similarly, dust compositions containing the active compounds are prepared from various of the solid, surface-active dispersing agents such as fuller's earth, attapulgite and other clays, as well as from solid fertilizer compositions. In preparing such compositions, the carrier is mechanically ground with the pyrazole compound or wet with a solution or dispersion thereof in a volatile organic solvent. These solid compositions may, if desired, also contain an alkyl aryl sulfonate or other surface-active dispersing agent. Depending upon the proportions of ingredients, these compositions can be employed without further modification or be considered as concentrates and subsequently further diluted with solid surface-active dispersing agent, talc, chalk, gypsum, or the like to obtain the desired treating composition. Furthermore, such concentrate compositions can be dispersed in water with or without added dispersing agent or agents to prepare aqueous soil treating compositions.

Soil treatment compositions can be prepared by dispersing the pyrazole compound in fertilizers such as ammonium fertilizer or organic nitrogen fertilizer. The resulting fertilizer composition can be employed as such or can be modified as by dilution with additional nitrogen fertilizer or with inert solid carrier to obtain a composition containing the desired amount of active agent for treatment of soil. Further, an aqueous dispersion of the pyrazole compound-fertilizer composition can be prepared and administered to the growth medium. Fertilizer compositions comprising the pyrazole compound in intimate admixture with ammonium fertilizers constitute preferred embodiments of the present invention.

In fertilizer compositions comprising a reduced nitrogen fertilizer, it is desirable that the pyrazole compound be present in an amount of at least about 0.05 percent by weight based on the weight of the nitrogen present in the fertilizer as reduced nitrogen and can be present in amounts as high as 95 percent by weight of the reduced nitrogen in the fertilizer. Generally, though, amounts of pyrazole compound in excess of about 25 percent yield no greater advantage and are therefore seldom used. Thus, when a fertilizer composition contains both reduced nitrogen and other forms of nitrogen, such as in the case of ammonium nitrate fertilizer compositions, the amount of pyrazole compound is based on the weight of nitrogen present in the ammonium component.

In operations carried out in accordance with the present invention, the soil can be impregnated in any convenient fashion with the active pyrazole compound or a composition containing the latter. For example, these modified or unmodified compositions can be mechanically mixed with the soil; applied to the surface of soil and thereafter dragged or disced into the soil to a desired depth; or transported into the soil with a liquid carrier such as by injection, spraying or irrigation. When the distribution is carried out by introducing the pyrazole compound in the water employed to irrigate the soil, the amount of water is varied in accordance with the moisture content of the soil in order to obtain a distribution of the pyrazole compound to the desired depth. The pyrazole compound can be readily and conveniently distributed to a depth of a few inches to 4 feet by irrigation methods. The preferred methods embrace procedures using any of these steps or combination of steps wherein pyrazole compound is distributed in the soil substantially simultaneously with a reduced nitrogen fertilizer.

The following examples illustrate the invention but are not to be construed as limiting.

EXAMPLE 1

An aqueous ammonium fertilizer composition containing 500 parts by weight of nitrogen and 25 parts by weight of pyrazole per million parts of aqueous medium was prepared by dispersing a 1 percent (weight by volume of solvent) acetone solution of pyrazole in aqueous ammonium sulfate solution. (The amount of nitrogen in all examples is based on the nitrogen present in the fertilizer in the reduced form.)

The composition so prepared was employed to treat seed beds of sandy loam soil having a pH of about 8, containing essentially no organic material and having been freed of nitrite and nitrate nitrogen by prior thorough leaching. The seed beds were in containers which admitted of being sealed to prevent loss of moisture. In the treating operation, the composition was applied to the seed beds as a soil drench, and the soil in the beds thoroughly mixed to insure a substantially uniform distribution of the composition throughout the soil. The amount of composition employed was sufficient to supply 100 parts by weight of nitrogen and 5 parts by weight of pyrazole per million parts by weight of soil. In a check operation, other seed beds similarly prepared were fertilized with a similar aqueous fertilizer composition containing the same amount of acetone but no pyrazole. The composition was applied in an amount to supply the same concentration of nitrogen to the soil as the treating composition containing pyrazole. All of the seed beds were then sealed and the soil maintained at about 70° F. for a period of 14 days.

At the end of the 14 day period, the seals were removed from all seed beds, samples of soil taken from the different seed beds, and the extent of nitrification of the added ammonium sulfate fertilizer determined by analyses for combined nitrate plus nitrite nitrogen. The determinations were carried out by extracting the nitrate and nitrite from the soil with a saturated calcium sulfate solution, developing color in the clear supernatant of the extract with diphenylamine in sulfuric acid, and comparing the color with a standard solution containing known concentrations of nitrate and nitrite ions. This procedure is similar to that described in "Colorimetric Methods of Analysis" by F. D. Snell and C. T. Snell, D. Van Norstrand Company, Inc., Volume II, 3rd Edition, page 801.

The percent nitrification of added ammonium sulfate in the seed beds treated with pyrazole was found to be 9 percent, whereas the percent nitrification of added ammonium sulfate in the check beds was found to be 100 percent.

EXAMPLE 2

The operation described in example 1 was repeated, but using one or the other of the compounds indicated in table I below in place of the pyrazole. The following results were obtained:

TABLE I

| Pyrazole compound (5 p.p.m.) | Percent nitrification of added (NH$_4$)$_2$SO$_4$ 100 p.p.m. nitrogen) after 14 days in soil |
| --- | --- |
| None (check) | 100 |
| 4-bromopyrazole | 5 |
| 4-chloropyrazole | 0 |
| 4-iodopyrazole | 10 |
| 1-nitropyrazole | 10 |
| 4-bromopyrazole hydrobromide | 10 |
| 4-bromo-3-methylpyrazole | 10 |
| 5-chloro-3-methylpyrazole | 10 |
| 3-methylpyrazole | 10 |
| 3,5-dimethylpyrazole | 10 |
| 1-allylpyrazole | 10 |

EXAMPLE 3

Operations are carried out in the manner described in example 1 wherein each of the pyrazoles enumerated below is employed in lieu of pyrazole. Determinations made at the end of 14 days show that soil treated with fertilizer containing any one of these compounds undergoes no substantial nitrification, while soil treated with fertilizer compositions containing no pyrazole compound undergoes complete nitrification.

pyrazole hydrochloride
3,4-diiodopyrazole
3,4-dibromopyrazole
3-chloro-4-nitropyrazole
4-bromo-1-nitropyrazole
1,4-dinitropyrazole
3-methyl-1-nitropyrazole
3-methyl-4-nitropyrazole
3-propyl-1-nitropyrazole
4-chloro-1-methylpyrazole
1-propynylpyrazole
4-bromo-1-allylpyrazole
3,4-dibromopyrazole sulfate
5-chloro-3-methylpyrazole phosphate

EXAMPLE 4

An aqueous ammonium fertilizer composition containing 1,000 parts by weight of nitrogen and 10 parts by weight of pyrazole per million parts of aqueous medium was prepared by dispersing a 0.8 percent (weight by volume of solvent) acetone solution of pyrazole in aqueous ammonium sulfate solution.

The composition so prepared was employed to treat seed beds of sandy loam soil having pH of about 8 containing essentially no organic material and having been freed of nitrite and nitrate nitrogen by prior thorough leaching. The seed beds were in containers which admitted of being sealed to prevent loss of moisture. In the treating operation, the composition was applied to the seed beds as a soil drench, and the soil in the beds thoroughly mixed to insure a substantially uniform distribution of the composition throughout the soil. The amount of composition employed was sufficient to supply 200 parts by weight of nitrogen and 2.0 parts by weight of pyrazole per million parts by weight of soil. In a check operation other seed beds similarly prepared were fertilized with a similar aqueous fertilizer composition containing the same amount of acetone and ammonium sulfate but no pyrazole, the latter being applied in an amount to supply the same concentration of nitrogen to the soil as the treating composition containing pyrazole. All of the seed beds were then sealed and the soil temperature of all beds maintained at about 70° F. for a period of about 4 weeks. At the end of the first, second and third weeks, the seals were removed to aerate the soil briefly and then replaced. At the end of the 4 week period, the seals were finally removed. Samples of soil were taken from the different seed beds and the soil samples analyzed for the presence of ammonium nitrogen. The analysis was carried out by distillation of the soil, in the presence of magnesium oxide, to obtain ammonia, sorption of the resulting ammonia by boric acid, and titration of the resulting solution with a standard solution of hydrochloric acid. From these operations, the amount of ammonium nitrogen in the soil was calculated. This method of analysis for ammonium nitrogen is a slight modification of that described by Black on page 1,198 of "Methods of Soils Analysis," No. 2, American Society of Agronomy, Inc., Madison, Wis., 1965. It was found that from the soils treated with 2 parts per million of pyrazole there was recovered 160 parts of the 200 parts of ammonium nitrogen added while from the check soils no ammonium nitrogen was recovered from the 200 parts added.

EXAMPLE 5

The operations described in example 4 were repeated, but with the pyrazole being replaced by 4-chloropyrazole, 4-bromopyrazole or 4-iodopyrazole and with the employment of additional aqueous ammonium fertilizer compositions containing 2.5 and 1.0 parts by weight of one of the 4-halapyrazoles per million parts of the aqueous medium. The following results were obtained in the evaluation of these halopyrazoles:

TABLE II

| Pyrazole compound Added to soil (p.p.m.) | Ammonium nitrogen recovered (p.p.m.) from 200 p.p.m. nitrogen Added to soil |
| --- | --- |
| None (check) | 0 |
| 4-chloropyrazole | |
| 2.0 | 200 |
| 2.0 | 200 |
| 0.5 | 198 |
| 0.2 | 188 |
| 4-bromopyrazole | |
| 2.0 | 188 |
| 0.5 | 186 |
| 0.2 | 136 |
| 4-iodopyrazole | |
| 2.0 | 190 |
| 0.5 | 178 |
| 0.2 | 80 |

EXAMPLE 6

The operation of this example was conducted with pyrazole as well as with 4-bromopyrazole. The test procedure used with each chemical was one wherein aqueous soil-treating compositions were prepared by dissolving the pyrazole compound in acetone at three concentration levels to provide solutions containing 4, 2 and 1 percent, respectively, on a weight per volume bases. A fertilizer component was prepared by mixing 0.05 percent of an emulsifying agent (polyethylene glycol 600 oleate) in aqua ammonia containing 21 to 23 percent nitrogen. The solution of the pyrazole compound and the fertilizer solution were then mixed together in varying proportions so as to provide compositions variously containing 2, 1 and 0.5 percent by weight of the pyrazole compound in terms of the weight of nitrogen present in the composition. Seed beds of a sandy loam soil having a pH of 8 and a 12 percent moisture content were treated with the above-described compositions. This treatment was carried out in such a fashion as to provide the seed bed with a concentration of 125 p.p.m. by weight of nitrogen, the composition being injected into the seed bed at a point about 3 inches below the soil surface. Other seed beds having the same characteristics were treated with compositions differing from the foregoing only in the absence of the pyrazole compound. Following the treatment, all seed beds were sealed to prevent loss of moisture and the soil was maintained at 70° F. for 30 days. At the end of this time, the treated and the check seed beds were analyzed for ammonium nitrogen in accordance with the same procedure as described above in example 4. The results of the operations were as reported below in table III.

TABLE III

| Pyrazole compound (parts by weight per 100 parts by weight of nitrogen) | Ammonium nitrogen recovered (parts by weight recovered, per million parts by weight of soil, from 125 parts by weight present) |
| --- | --- |
| Pyrazole | |
| 2.0 | 108 |
| 1.0 | 84 |
| 0.5 | 46 |
| 4-bromopyrazole | |
| 2.0 | 102 |
| 1.0 | 100 |
| 0.5 | 92 |
| None (check) | 18 |

EXAMPLE 7

The operation of this example was conducted with pyrazole as well as with 4-bromopyrazole. The test procedure was one wherein an inhibitor component was prepared by (a) mixing and grinding together 0.1 gram of the pyrazole compound and 0.15 gram of attapulgite, (b) adding 0.75 gram of pyrophyllite thereto and grinding the resulting mixture until a finely powdered uniform composition was obtained. A fertilizer component was prepared by hammermilling together a 50:50 mixture by weight of ammonium sulfate and pyrophyllite to obtain a fine uniform composition. The inhibitor component and fertilizer component were mixed together on a roller mill to obtain soil-treating compositions containing the pyrazole compound in varying concentrations expressed as percent based on the weight of nitrogen in the composition, these varying concentrations being as follows: 1, 0.5 and 0.25 percent. These compositions were employed to fertilize various beds of sandy loam soil containing essentially no organic material, having a pH of about 8, and having a moisture content of about 20 percent. The soil employed had been previously leached to remove all nitrate and nitrite nitrogen constituents. The beds were in containers which admitted of being sealed to prevent loss of moisture. The seed beds were fertilized in areas to be planted by providing depressions and adding thereto the fertilizer treating composition and then covering the composition with soil. The amount of composition employed was sufficient to supply 206 parts by weight of nitrogen and, variously, 2, 1, 0.5 and 0.2 parts by weight of the pyrazole compound, per million parts by weight of soil. Thereupon, the seed beds were sealed to prevent loss of moisture and the soil maintained at temperatures of about 70° F. for 4 weeks. At 7 day intervals, the seals were removed, air passed over the soil, and the seals then replaced. At the end of the 4 week period, the seals were finally removed and samples of soil were analyzed, as described in example 4, for ammonium nitrogen content. The results were compared with check seed beds wherein no pyrazole compound was added to the fertilizer composition, but which were otherwise identically handled. The results obtained are given in table IV below.

TABLE IV

| Pyrazole compound (parts per million parts by weight of soil) | Ammonium nitrogen recovered (parts by weight recovered, per million parts by weight of soil, from 206 parts by weight present) |
| --- | --- |
| Pyrazole | |
| 2.0 | 166 |
| 1.0 | 148 |
| 0.5 | 140 |
| 4-bromopyrazole | |
| 2.0 | 186 |
| 1.0 | 156 |
| 0.5 | 142 |
| None (check) | 34 |

EXAMPLE 8

Concentrate compositions are prepared as follows:

A. Twenty-five parts by weight of pyrazole, 65 parts by weight of xylene and 10 parts by weight of an alkylated aryl polyether alcohol are mechanically mixed together to obtain an emulsifiable liquid composition.

B. Ninety parts by weight of pyrazole sulfate and 10 parts by weight of an alkyl aryl sulfonate are mechanically mixed together to obtain a water-dispersible mixture.

A composition of each of the two foregoing types is similarly prepared with each of 4-bromopyrazole, 4-iodopyrazole, 4-chloropyrazole, 3,4-diiodopyrazole, 3,4-dibromopyrazole, 3-chloro-4-nitropyrazole, 3-methylpyrazole, 1-nitropyrazole, 3-nitropyrazole, 4-nitropyrazole, 4-bromo-1-nitropyrazole, 1,4-dinitropyrazole, 5-chloro-3-methylpyrazole, 4-bromo-3-methylpyrazole, 3,5-dimethylpyrazole, 1,3-dimethylpyrazole, 3-methyl-1-nitropyrazole, 3-methyl-4-nitropyrazole, 3-propyl-1-nitropyrazole, 4-chloro-1-methylpyrazole, 1-ethylpyrazole, 1-allylpyrazole, 1-propynylpyrazole, 4-bromo-1-allylpyrazole, 1-propylpyrazole, and salts of the foregoing compounds with mineral acids including hydrochloric acid, hydrobromic acid, hydroiodic acid, sulfuric acid, nitric acid and phosphoric acid.

These compositions can be dispersed in water to produce aqueous compositions having desirable wetting and penetrating properties. These aqueous compositions are then employed to treat soil in an amount sufficient to distribute the active agent therein in effective concentrations. The concentrates can also be dispersed in aqua ammonia to prepare fertilizer compositions.

EXAMPLE 9

A dust composition suitable for application to and admixture with soil or other growth medium to suppress the nitrification of ammonium nitrogen therein is prepared by mechanically mixing and grinding together 5 parts by weight of pyrazole, 65 parts by weight of gypsum as a finely divided carrier and 30 parts by weight of a hydrous aluminum silicate (Barden Clay) as a surface-active dispersing agent.

Compositions of this same type are similarly prepared with each of the pyrazoles set forth in example 8.

EXAMPLE 10

Fertilizer compositions are prepared as follows:

A. Pyrazole is mechanically mixed with diammonium phosphate to prepare reduced nitrogen fertilizer compositions containing 5 percent by weight of pyrazole.

B. The nitrate salt of pyrazole is mechanically mixed with ammonium nitrate to prepare reduced nitrogen fertilizer compositions containing 3 percent by weight of the nitrate salt of pyrazole.

C. Pyrazole hydrochloride is mechanically mixed with urea to prepare reduced nitrogen fertilizer compositions containing 2 percent by weight of pyrazole hydrochloride.

A composition of each of these three types is similarly prepared with each of the other pyrazole compounds set forth in example 8.

These fertilizer compositions are distributed in soil to supply the nitrogen requirements for plant nutrition. The treated soil is resistant to nitrification and provides nitrogen available for plant growth over a prolonged period of time.

The various pyrazoles to be employed in accordance with this invention can be prepared using known procedures. Thus, of the monohalo compounds, wherein the halogen atom is usually present in the 4-position of the ring, 4-bromopyrazole can be prepared by reacting pyrazole with bromine in aqueous solution at ambient temperatures. 3(5),4-dibromopyrazole can be prepared by reacting the monobromo derivative with bromine in a carbon tetrachloride solution in the presence of an iron catalyst, the reaction proceeding at moderately elevated temperatures. 4-iodopyrazole can be prepared by reacting pyrazole with iodine, the reaction being conducted in either hot water or at room temperatures in water in the presence of sodium acetate. The 3(5),4-diiodopyrazoles can be prepared by first reacting pyrazole with iodine in aqueous solution in the presence of silver nitrate and nitric acid, the product of this reaction being 1,3,4-triiodopyrazole. The iodine atom in the 1-position is then removed by reduction with sulfur dioxide. 4-chloropyrazole can be prepared by reacting pyrazole with chlorine in carbon tetrachloride at about 0° C., or it can be prepared by reacting pyrazole with sodium hypochlorite at 25° C.

The lower alkyl derivatives of pyrazole can be prepared by the reaction of a suitable β-dicarbonyl compound with hydrazone or a substituted hydrazine, the reaction proceeding in alcoholic solution at ambient or moderately elevated temperatures. Thus, 3(5)-methylpyrazole can be prepared by the reaction of hydrazine with an equimolar amount of acetoacetaldehyde ($CH_3COCH_2CHO$), while 3,5-dimethylpyrazole is prepared by similarly reacting hydrazine with 2,4-pentanedione. Reaction of methylhydrazine, allylhydrazine or propynylhydrazine with malondialdehyde gives 1-methylpyrazole, 1-allylpyrazole or 1-propynylpyrazole, respectively. Pyrazole itself can be prepared in this same general fashion by reacting malondialdehyde and hydrazine.

1-nitropyrazole can be prepared by the reaction of pyrazole with fuming nitric acid in the presence of acetic acid and acetic anhydride, the reaction proceeding with mild heating. This product can be converted to 4-nitropyrazole by heating the same in the presence of concentrated sulfuric acid. To obtain a 1,4-dinitropyrazole, the 4-nitropyrazole is reacted with fuming nitric acid in the presence of acetic acid and acetic anhydride. 4-bromo-1-nitropyrazole can be prepared by reacting 1-nitropyrazole with bromine in aqueous solution at ambient temperatures. 3-chloro-4-nitropyrazole can be obtained by reacting 3-hydroxy-4-nitropyrazole with phosphorous oxychloride in a sealed tube at 100° C. 3-methyl-1-nitropyrazole can be prepared by reacting 3-methylpyrazole with fuming nitric acid in the presence of acetic acid and acetic anhydride, and the resulting 1-nitro product can be converted to a 4-nitro product by heating the former in the presence of concentrated sulfuric acid. The same methods of preparation apply to other alkyl substituted nitropyrazoles. 4-chloro-1-methylpyrazole can be prepared by reacting 1-methylpyrazole with chlorine in carbon tetrachloride at 0° C. 4-bromo-3-methylpyrazole is formed as 3-methylpyrazole is reacted with bromine in aqueous solution, while 5-chloro-3-methylpyrazole tends to be the product formed as 3-methylpyrazole is reacted with chlorine in carbon tetrachloride at 0° C. 4-bromo-1-allylpyrazole can be formed by reacting 1-allylpyrazole with bromine in aqueous solution.

The possibility of isomers exists in all instances where the groups on the nuclear carbons adjacent to the annular nitrogens are different. For simplicity, the compounds referred to herein are generally named as the 3-isomer rather than the 5-isomer. However, references made above to 3(5)-substituted products indicate the presence of possible isomers.

The mineral acid addition salts to be employed in accordance with the present invention are prepared in standard procedures, in which the pyrazole compound is reacted with the desired mineral acid. The reaction is carried out in a liquid reaction medium and the reactants are employed in amounts representing stoichiometric proportions. The reaction goes forward readily at room temperatures with the preparation of the desired salt product, which typically appears in the liquid reaction mixture as a crystalline solid. The product, a solid, is separated by filtration or decantation, or the liquid reaction mixture can be removed by evaporation to separate the product. The salt products are generally of low solubility in organic liquids and of moderate solubility in water.

When it is desired that one of the salt products of the present invention be applied to soil simultaneously with the application of a nitrogen fertilizer, it is often preferred that the specific salt product be prepared in conjunction with the preparation of the nitrogen fertilizer. Representative nitrogen fertilizers for which such procedures are particularly appropriate are ammonium phosphate, ammonium sulfate, ammonium nitrate and ammonium chloride. In these procedures, the base form of pyrazole compound is reacted with the given mineral acid simultaneously with its reaction to form the respective nitrogen fertilizer. The resulting product comprises the given nitrogen fertilizer or fertilizers and the corresponding pyrazole compound in salt form and is advantageously employed in the practice of the present invention.

I claim:

1. A method for suppressing the nitrification of ammonium nitrogen in growth medium having reduced nitrogen present therein which comprises impregnating said growth medium with a nitrification inhibiting amount of 1-nitropyrazole or a mineral acid addition salt thereof.

* * * * *